(12) United States Patent
Kim et al.

(10) Patent No.: US 8,467,690 B2
(45) Date of Patent: Jun. 18, 2013

(54) METHOD AND SYSTEM FOR CANCELLATION OF CHROMATIC DISPERSION COMBINED LASER PHASE NOISE

(75) Inventors: Inwoong Kim, Allen, TX (US); Takao Naito, Plano, TX (US); Olga I. Vassilieva, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 363 days.

(21) Appl. No.: 12/879,242

(22) Filed: Sep. 10, 2010

(65) Prior Publication Data
US 2012/0063768 A1    Mar. 15, 2012

(51) Int. Cl.
*H04B 10/18*    (2006.01)
*H04B 10/04*    (2006.01)

(52) U.S. Cl.
USPC ............. 398/194; 398/29; 398/147; 398/81

(58) Field of Classification Search
USPC .................................. 398/29, 81, 147, 194
See application file for complete search history.

(56) References Cited

U.S. PATENT DOCUMENTS

| | | | | |
|---|---|---|---|---|
| 7,809,271 | B2 * | 10/2010 | Piciaccia et al. | 398/81 |
| 2003/0123884 | A1 * | 7/2003 | Willner et al. | 398/212 |
| 2007/0153291 | A1 * | 7/2007 | Dorrer | 356/484 |
| 2009/0142070 | A1 * | 6/2009 | Boduch et al. | 398/148 |
| 2010/0283996 | A1 * | 11/2010 | Wan et al. | 356/73.1 |
| 2010/0329698 | A1 * | 12/2010 | Nakashima | 398/208 |

* cited by examiner

*Primary Examiner* — Leslie Pascal
(74) *Attorney, Agent, or Firm* — Baker Botts L.L.P.

(57) ABSTRACT

Methods and systems are provided for cancellation of chromatic dispersion combined laser phase noise. A method may include measuring a differential of laser phase noise using two optical pilot signals, the pilot signals each having a different optical frequency, or using an optical carrier and a pilot signal. The method may also include determining an approximate laser phase noise present in an optical system based on the measured differential of laser phase noise. The method may further include compensating for laser phase noise based on the determined approximate laser phase noise.

12 Claims, 4 Drawing Sheets

METHOD AND SYSTEM FOR CANCELLATION OF CHROMATIC DISPERSION COMBINED LASER PHASE NOISE

TECHNICAL FIELD

The present disclosure relates generally to optical networks and, more particularly, to a method and system for cancellation of chromatic dispersion combined laser phase noise.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. An optical network may be configured to combine modulated signals at various wavelengths or optical frequencies (also known as "channels") into a single optical fiber. Each disparate channel may include optically encoded information to be communicated throughout the optical network. Such combining of various channels into a single fiber is known as wavelength-division multiplexing (WDM). Each optical wavelength (or carrier) may carry multiple sub-carriers using frequency-division multiplexing (FDM).

Orthogonal frequency-division multiplexing (OFDM) is a FDM scheme in which a plurality of closely-spaced orthogonal sub-carriers is used to carry data. The data is divided into several parallel data channels, one for each sub-carrier. OFDM modulation may be implemented using inverse discrete Fourier transformation (IDFT) and an optical modulator instead of using multiple modulators and oscillators for sub-carriers as is the case in traditional FDM. The demodulation is also achieved using discrete Fourier transformation (DFT) instead of using multiple filters and oscillators for subcarriers. The separation of subcarrier channels is the integer multiple of the inverse observation period for a symbol to assure orthogonality.

An optical signal comprised of disparate subcarriers may experience optical dispersion (and in particular, chromatic dispersion). Because of dispersion, sub-carriers of differing frequencies may propagate with different speeds in an optical fiber. Optical subcarriers have phase noise due to finite linewidth of the laser providing a source of electromagnetic energy for a fiber. Such laser phase noise combined with dispersion, if not compensated, may lead to non-orthogonality between sub-channels, thus degrading the OFDM signal. Phase noise is the frequency domain representation of rapid, short-term, random fluctuations in the phase of a waveform. Signal degradation due to laser phase noise combined with chromatic dispersion may be significant, especially when optical OFDM signals are created using a distributed feedback (DFB) laser.

SUMMARY

Methods and systems are provided for cancellation of chromatic dispersion combined laser phase noise. A method may include measuring a time differential of laser phase noise between an optical carrier and a pilot signal or between two optical pilot signals, the pilot signals each having a different optical frequency. The method may also include determining an approximate laser phase noise present in an optical system based on the measured time differential of laser phase noise. The method may further include compensating for laser phase noise based on the determined approximate laser phase noise.

Technical advantages of one or more embodiments of the present disclosure may provide methods and systems for measurement and compensation of chromatic dispersion combined laser phase noise, which may enable use of large linewidth lasers (e.g., distributed feedback lasers), for long distance transmission of optical OFDM signals.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
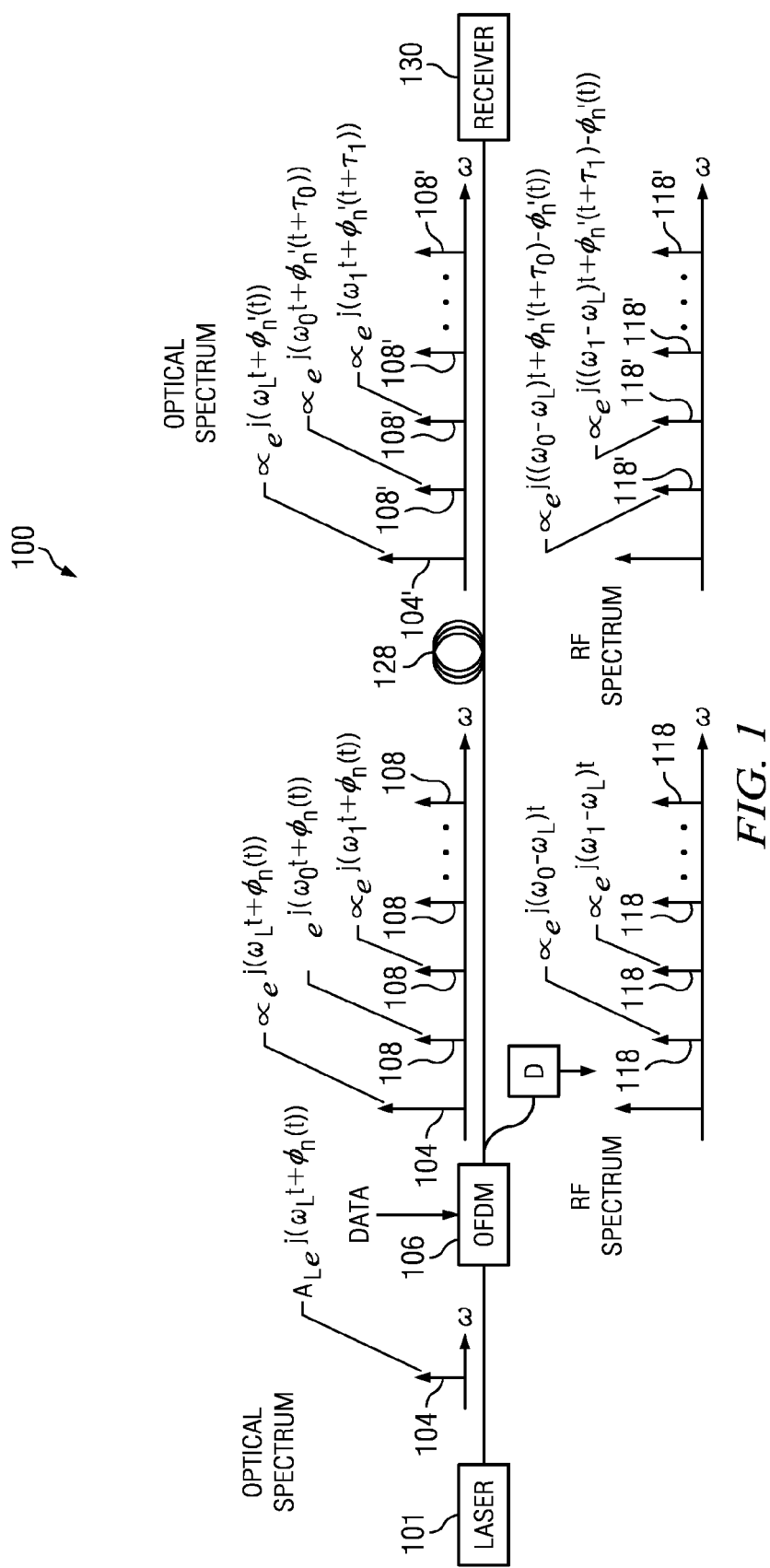
FIG. 1 illustrates a portion of an example optical system, in accordance with certain embodiments of the present disclosure.

FIG. 1 illustrates a portion of an example optical system 100, in accordance with certain embodiments of the present disclosure. As shown in FIG. 1, example optical system 100 may include a laser 101, an optical orthogonal frequency-division multiplexer (OFDM), a transmission fiber 128, and other components. Laser 101 may be any system, device, or apparatus configured to emit a carrier signal 104 of electromagnetic energy. In certain embodiments, laser 101 may be a distributed feedback laser. Carrier signal 104 may be represented in the optical domain by the equation $A_L e^{j(\omega_L t + \phi_n(t))}$, where $|A_L|^2$ is the power of the laser signal, $\omega_L$ is the angular frequency of optical carrier signal 104, t is time, and $\phi_n(t)$ is the phase noise of carrier signal 104 as a function of time. Carrier signal 104 may be sent to OFDM 106 via a fiber, waveguide, or other suitable transmission medium. Based on data received by OFDM 106, OFDM 106 may output a plurality of sub-carrier signals 108, wherein the sub-carrier signals 108 encode the data received by OFDM 106. OFDM 106 may include any suitable components to perform the functionality disclosed herein, including without limitation a digital signal processor (DSP), a driver (e.g., radio-frequency amplifier), and/or an optical modulator. As shown in FIG. 1, the frequency of each sub-carrier signal 108 may be proximate to the frequency of the carrier signal 104. As shown in FIG. 1, the first sub-carrier signal 108 may be proportional to $e^{j(\omega_0 t + \phi_n(t))}$, where $\omega_0$ is the angular frequency of the first sub-carrier signal 108; the second sub-carrier signal 108 may be proportional to $e^{j(\omega_1 t + \phi_n(t))}$, where $\omega_1$ is the angular frequency of the second sub-carrier signal 108; and so on. For purposes of exposition, static phase shift due to chromatic dispersion is not shown in the foregoing equations.

Consider a receiver (not shown) present near the output of OFDM 106. By determining the beat of each sub-carrier 108 against the carrier signal 104 (e.g., mathematically multiplying each sub-carrier 108 signal by the complex conjugate of carrier signal 104), such receiver would in effect be demodulating the sub-carrier signals 108 such that the sub-carrier signals 108 would have corresponding radio-frequency sub-carrier signals 118 depicted in FIG. 1. Subcarrier frequencies may be chosen such that any beating signal between sub-carriers does not fall in the OFDM band in the radio-frequency domain. As shown in FIG. 1, the corresponding radio-frequency sub-carrier signal 118 for the first sub-carrier signal 108 may be proportional to $e^{j(\omega_0 - \omega_1)t}$, the corresponding radio-frequency sub-carrier signal 118 for the second sub-carrier signal 108 may be proportional to $e^{j(\omega_1 - \omega_1)t}$, and so on. Notably, the phase noise $\phi_n(t)$ cancels out of the radio-frequency sub-carrier signals 118, thus maintaining orthogonality of the sub-carrier signals 118.

After the multi-channel OFDM signal is transmitted from node OFDM 106, the signal may travel over one or more optical fibers 128. According to particular embodiments, signal transmission over fiber(s) 128 may introduce dispersion into the subcarrier signal. For example, optical dispersion in fibers 128 may cause the phase noise of the carrier and sub-carrier signals to differ, due to the fact that the sub-carriers may propagate with different speeds because of chromatic dispersion. To illustrate, after transmission over fiber(s) 128, carrier signal 104 may be represented as carrier signal 104' and may be equal to $A_L e^{j(\omega_L t + \phi_n'(t))}$, where $\phi_n'(t)$ is the phase noise of carrier signal 104' after transmission through fiber(s) 128 as a function of time. In fact, the phase noise $\phi_n'(t)$ may be approximately the same as $\phi_n'(t)$ since the linewidth of a distributed feedback (DFB) laser is order of MHz. Additionally, as shown in FIG. 1, the first sub-carrier signal 108' after transmission through fiber(s) 128 may be proportional to $e^{j(\omega_0 t + \phi_n'(t+\tau_0))}$, where $\tau_0$ is the phase noise delay due to chromatic dispersion at the angular frequency $\omega_0$; the second sub-carrier signal 108' after transmission through fiber(s) 128 may be proportional to $e^{j(\omega_1 t + \phi_n'(t+\tau_1))}$, where $\tau_1$ is the phase noise delay due to chromatic dispersion at the angular frequency $\omega_1$; and so on. The static phase shift of subcarrier channels due to chromatic dispersion is not included in these expressions, and will not be included hereafter, because it does not affect the orthogonality between subcarriers. $\tau_0$ may be calculated from the equation $\tau_0 = D\Delta\lambda_o L$, where D is the dispersion of fiber 128, L is the transmission length through fiber 128, and $\Delta\lambda_o$ is the wavelength difference between carrier signal 104 and subcarrier signal 108 (e.g. $\Delta\lambda_o = 2\pi c(1/\omega_L - 1/\omega_0)$, where c is the speed of light). $\tau_1$ may also be calculated using an analogous equation.

Because of these differing chromatic dispersion combined laser phase noises in the sub-carriers, orthogonality between the sub-carriers may not be maintained. To illustrate, consider a receiver (not shown) present after fiber(s) 128. By determining the beat of each sub-carrier 108' against the carrier signal 104' (e.g., mathematically multiplying each sub-carrier 108 signal by the complex conjugate of carrier signal 104), the corresponding radio-frequency sub-carrier signal 118' for the first sub-carrier signal 108' may be proportional to $e^{j((\omega_0 - \omega_L)t + \phi_n'(t+\tau_0) - \phi_n'(t))}$, the corresponding radio-frequency sub-carrier signal 118' for the second sub-carrier signal 108' may be proportional to $e^{j((\omega_1 - \omega_L)t + \phi_n'(t+\tau_1) - \phi_n'(t))}$, and so on. Notably, the phase noise components do not cancel out, and the sub-channel signals 118' are non-orthogonal.

Figure 2:
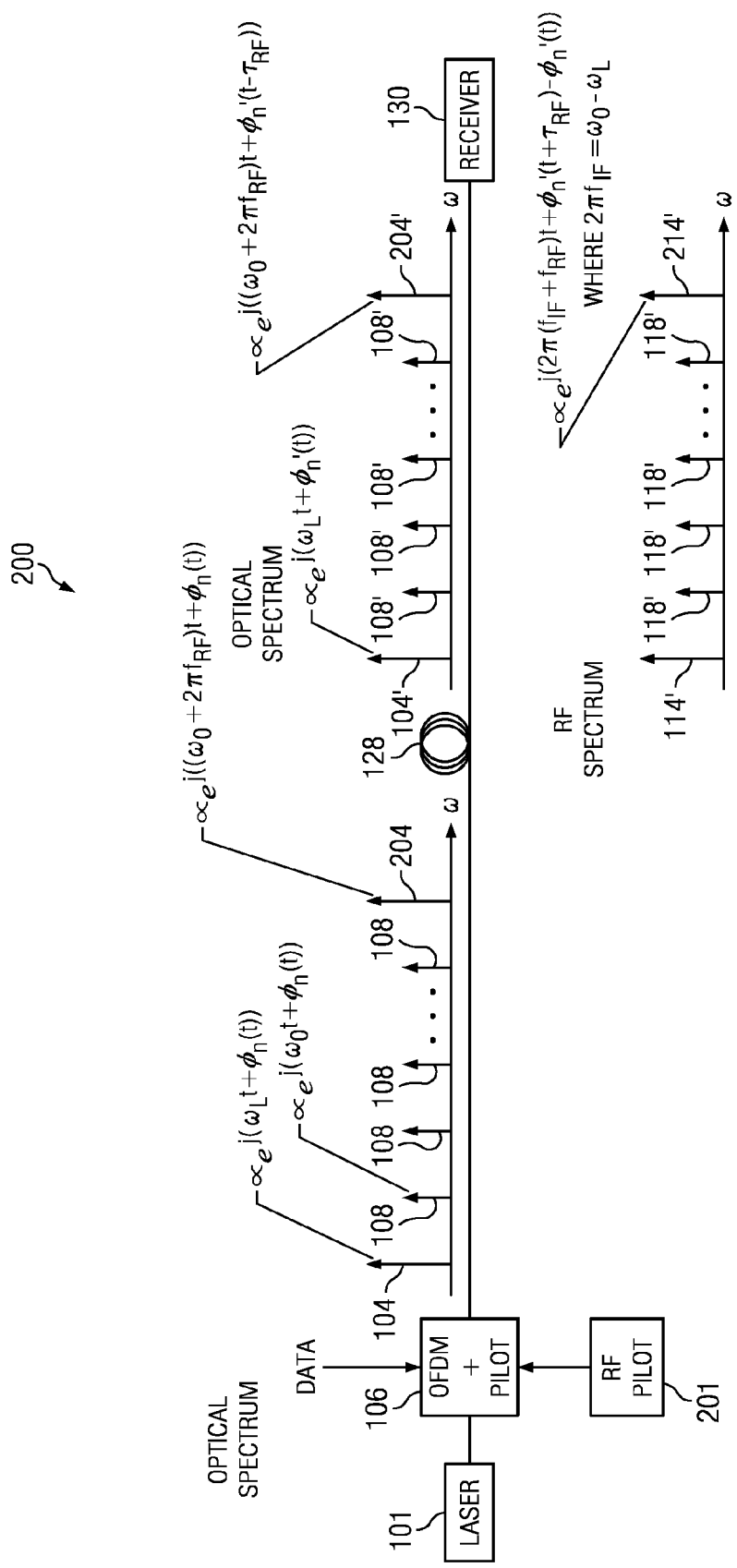
FIG. 2 illustrates a portion of an example optical system including measurement of time differential of laser phase noise and cancellation of chromatic dispersion combined laser phase noise, in accordance with certain embodiments of the present disclosure.

One possible solution for compensation of chromatic dispersion combined laser phase noise is depicted in FIG. 2. FIG. 2 illustrates a portion of an example optical system 200 including measurement of time differential of laser phase noise and cancellation of chromatic dispersion combined laser phase noise, in accordance with certain embodiments of the present disclosure. Optical system 200 may be similar to that of optical system 100, except that: (i) optical system 200 includes a receiver 130 (the functionality of which is described in greater detail below), and (ii) a radio-frequency pilot signal source 201 or another component of system 200 may be configured to transmit a pilot signal 204 in connection with carrier signal 104 and sub-carrier signals 108. The frequency of pilot signal 204 may be chosen such that beating between pilot signal 204 and subcarriers 108 do not fall in the OFDM band of a radio-frequency signal from a detector (e.g., a square law detector) present at receiver 130. As shown in FIG. 2, such pilot signal 204 may be proportional to $e^{j((\omega_0 + 2\pi f_{RF})t + \phi_n(t))}$, where $f_{RF}$ is the difference between the frequency of pilot signal 204 and the frequency of the first sub-carrier 104 ($\omega_0/2\pi$). After transmission through fiber(s) 128, pilot signal 204' may be proportional to $e^{j((\omega_0 + 2\pi f_{RP})t + \phi_n'(t+\tau_{RF}))}$, where $\tau_{RF}$ is the phase noise delay with respect to the phase noise of carrier signal 104 due to chromatic dispersion at the frequency of the pilot signal 204 ($f_{RF} + \omega_0/2\pi$). $\tau_{RF}$ may be calculated from the equation $\tau_{RF} = D\Delta\lambda_{RF} L$, where D is the dispersion of fiber 128, L is the transmission length through fiber 128, and $\Delta\lambda_{RF} L$ is the wavelength difference between carrier signal 104 and pilot signal 204 (e.g. $\Delta\lambda_{RF} = 2\pi c(1/\omega_L - 1/(\omega_0 + 2\pi f_{RF}))$, where c is the speed of light.

Receiver 130 may be configured to receive the multi-channel signal (including carrier signal 104', pilot signal 204', and sub-carrier signals 108'), and perform processing on such signals, as described in greater detail below. To perform its functions, receiver 130 may include any suitable components, including without limitation photodetectors, processors, digital signal processors, etc. In operation, receiver 130 may detect carrier signal 104' and pilot signal 204' and compare the signals to each other. Such comparison may be performed by determining the beat of pilot signal 204' against carrier signal 104', by mathematically multiplying pilot signal 204' by complex conjugate of carrier signal 104', by demodulating pilot signal 204' by carrier signal 104', or other suitable technique. If determining the beat of pilot signal 204' against carrier signal 104' is the technique used, the corresponding radio-frequency signal 214' may be proportional to $e^{j(2\pi(f_{IF} + f_{RF})t + \phi_n'(t + \tau_{RF}) - \phi_n'(t))}$, where the intermediate frequency $f_{IF} = (\omega_0 - \omega_L)/2\pi$. The phase noise of this beating signal, $\phi_n'(t + \tau_{RF}) - \phi_n'(t)$, is the time differential of the laser phase noise. This beating signal may be separated from an OFDM signal using an analog or digital electrical filter or any other appropriate method. From the comparison, the time differential of laser phase noise may be measured and the phase delay due to dispersion $\tau_{RF}$ may be calculated, and the phase noise $\phi_n'(t)$ may be found by solving for the equation:

$$\frac{d\phi_{n'}(t)}{dt'} \tau_{RF} \approx \phi_{n'}(t + \tau_{RF}) - \phi_{n'}(t) = \theta(t)$$

where $\theta(t)$ is the differential of the laser phase noise measured by receiver 130.

Figure 3:
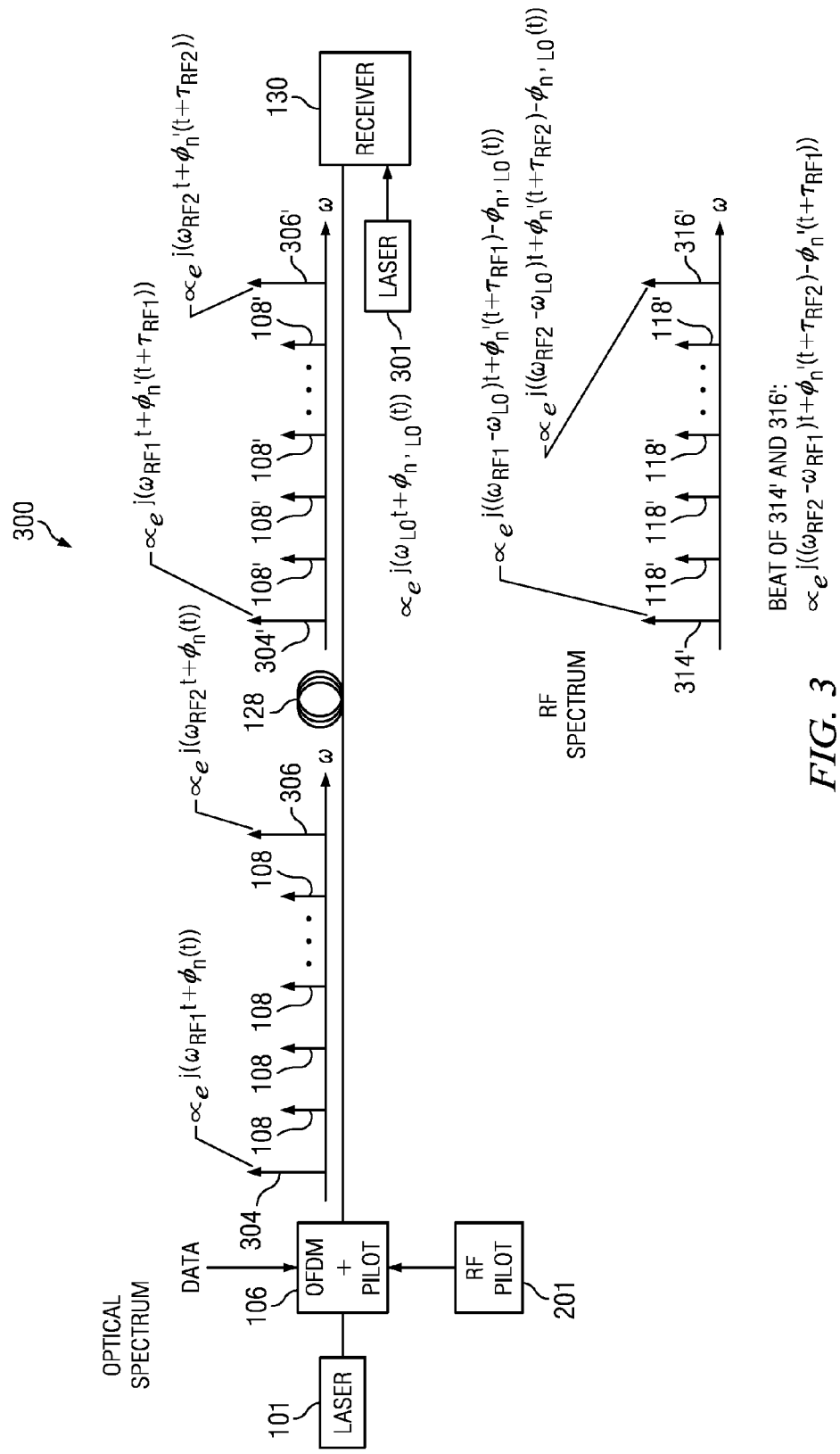
FIG. 3 illustrates a portion of another example optical system including measurement of time differential of laser phase noise and cancellation of chromatic dispersion combined laser phase noise, in accordance with certain embodiments of the present disclosure.

Another possible solution for compensation of chromatic dispersion combined laser phase noise is depicted in FIG. 3. FIG. 3 illustrates a portion of another example optical system 300 including measurement of time differential of laser phase noise and cancellation of chromatic dispersion combined laser phase noise, in accordance with certain embodiments of the present disclosure. Optical system 300 may be similar to that of optical system 100 and optical system 200, except that: (i) optical system 300 includes a laser 301 as a local oscillator to receiver 130 for coherent detection, and (ii) a radio-frequency pilot signal source 201 or another component of system 300 may be configured to transmit two pilot signals 304 and 306 in connection with sub-carrier signals 108. As shown in FIG. 3, pilot signal 304 may be proportional to $e^{j(\omega_{RF1}t+\phi_n(t))}$, where $\omega_{RF1}$ is the angular frequency of pilot signal 304, and pilot signal 306 may be proportional to $e^{j(\omega_{RF2}t+\phi_n(t))}$, is the angular frequency of pilot signal 306. After transmission through fiber(s) 128, pilot signal 304' may be proportional to $e^{j(\omega_{RF1}t+\phi_n'(t+\tau_{RF1}))}$, where $\tau_{RF1}$ is the phase noise delay due to chromatic dispersion at the frequency of pilot signal 304 ($\omega_{RF1}/2\pi$); and pilot signal 306' may be proportional to $e^{j(\omega_{RF2}t+\phi_n'(t+\tau_{RF2}))}$, where $\tau_{RF2}$ is the phase noise delay due to chromatic dispersion at the frequency of pilot signal 306 ($\omega_{RF2}/2\pi$).

In the embodiment depicted in FIG. 3, receiver 130 may be a coherent receiver. Receiver 130 may be configured to receive the multi-channel signal (including pilot signals 304' and 306'), and perform processing on such signals, as described in greater detail below. In operation, receiver 130 may detect pilot signals 304' and 306' and compare the signals to each other. Each of the pilot signals 304' and 306' may be demodulated by local laser 302, which has the characteristic $e^{j(\omega_{LO}t+\phi_{n,LO}(t))}$, wherein $\phi_{n,LO}(t)$ is the phase noise of local oscillator laser 302, which may be used as a local oscillator for receiver 130. As a result of such demodulation, the radio-frequency signal 314' corresponding to pilot signal 304' may be proportional to $e^{j((\omega_{RF1}-\omega_{LO})t+\phi_n'(t+\tau_{RF1})-\phi_{n,LO}(t))}$, and the radio-frequency signal 316' corresponding to pilot signal 306' may be proportional to $e^{j((\omega_{RF2}-\omega_{LO})t+\phi_{LO}t+\phi_n'(t+\tau_{RF2})-\phi_{n,LO}(t))}$. These pilot signals may be separated from an OFDM signal using an analog or digital electrical filter or any other appropriate method. The comparison may be performed by determining the beat of radio-frequency signal 316' against radio-frequency signal 314', by mathematically dividing radio-frequency signal 316' by radio-frequency signal 314', by demodulating radio-frequency signal 316' by radio-frequency signal 314', or other suitable technique. If determining the beat of signal 316' against signal 314' is the technique used, the resulting radio-frequency signal may be proportional to $e^{j((\omega_{RF2}-\omega_{RF1})t+\phi_n'(t+\tau_{RF2})-\phi_n'(t+\tau_{RF1}))}$. The phase noise of this beating signal, $\phi_n'(t+\tau_{RF2})-\phi_n'(t+\tau_{RF2})$, is the time differential of the laser phase noise. From the comparison, the differential of chromatic dispersion combined laser phase noise may be measured and the phase delays due to dispersion $\tau_{RF1}$ and $\tau_{RF2}$ may be calculated, and the phase noise $\phi_n'(t)$ may be found by solving for the equation:

$$\frac{d\phi_{n'}(t)}{dt'}(\tau_{RF2}-\tau_{RF1}) \approx \phi_{n'}(t+\tau_{RF2}) - \phi_{n'}(t+\tau_{RF1}) = \theta(t)$$

where $\theta(t)$ is the time differential of the chromatic dispersion combined laser phase noise measured by receiver 130. The quantity $(\tau_{RF2}-\tau_{RF1})$ may be calculated by the equation $(\tau_{RF2}-\tau_{RF1})=D\Delta\lambda_{RF1,2}L$ where D is the dispersion of fiber 128, L is the transmission length through fiber 128, and $\Delta\lambda_{RF1,2}$ is the wavelength difference between pilot signals 304 and 306 (e.g., $\Delta\lambda_{RF1,2}=2\pi c(1/\omega_{RF2})$), where c is the speed of light.

Although FIG. 3 depicts pilot tones 304 and 306 particular frequencies relative to sub-carrier signals 108, pilot tones 304 and 306 may have any other suitable frequency. For example, in some embodiments, pilot tones 304 and 306 may each have frequencies lower than the sub-carrier signals 108. As another example, in other embodiments, pilot tones 304 and 306 may each have frequencies higher than the sub-carrier signals 108. As yet another example, in certain embodiments, one or more of pilot tones 304 and 306 may have a frequency within the sub-carrier band. In addition, although FIGS. 2 and 3 depict a certain number of pilot tones, any suitable number of pilot tones may be used to improve the measurement accuracy.

Figure 4:
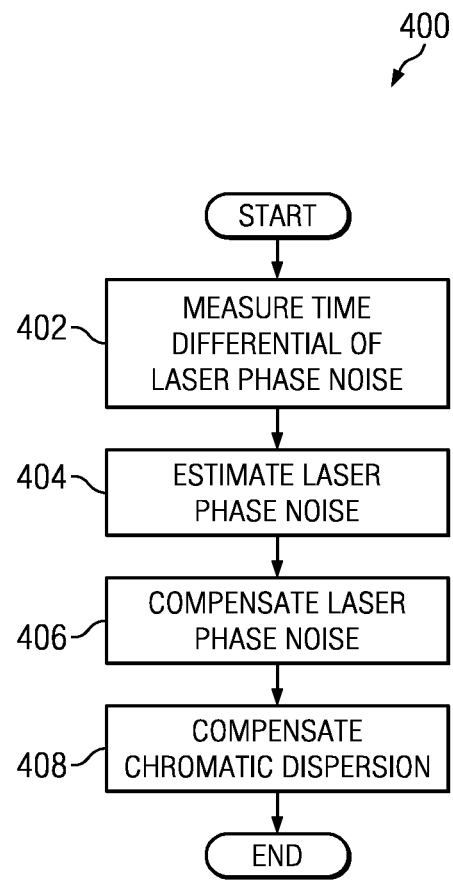
FIG. 4 illustrates a flow chart of an example method for cancellation of chromatic dispersion combined laser phase noise, in accordance with certain embodiments of the present disclosure.

FIG. 4 illustrates a flow chart of an example method 400 for cancellation of chromatic dispersion combined laser phase noise, in accordance with certain embodiments of the present disclosure. According to one embodiment, method 400 may begin at step 402. As noted above, teachings of the present disclosure may be implemented in a variety of configurations of systems 100, 200 and 300. As such, the preferred initialization point for method 400 and the order of the steps 402-408 comprising method 400 may depend on the implementation chosen.

At step 402, a receiver 130 or other suitable device may measure a time differential of laser phase noise using two pilot signals. In certain embodiments, one of the pilot tones may include a carrier signal.

At step 404, receiver 130 or other suitable device may determine the approximate laser phase noise present in an optical system based on the measured differential laser phase noise.

At step 406, receiver 130 or other suitable device may compensate for laser phase noise based on the determined approximate laser phase noise.

At step 408, receiver 130 or other suitable device may compensate for chromatic dispersion, in accordance with presently-known methods. As a result of steps 402-408, chromatic dispersion combined laser phase noise may be cancelled from an OFDM optical system.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100, 200, 300, or any other system operable to implement method 400. In certain embodiments, method 400 may be implemented partially or fully in software and/or firmware embodied in computer-readable media.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic. For example, a digital signal processor (DSP), such as an application specific integrated circuit (ASIC) or a field-programmable gate array (FPGA) may be used. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to optical nodes 100, 200, and 300 without departing from the scope of the disclosure. The components of optical nodes 100, 200, and 300 may be integrated or separated. Moreover, the operations of optical nodes 100, 200, and 300 may be performed by more, fewer, or other components. Additionally, operations of optical nodes 100, 200, and 300 may be performed using any suitable logic. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A method for cancellation of chromatic dispersion combined laser phase noise, comprising:
    measuring a time differential of chromatic dispersion combined laser phase noise between two optical pilot signals transmitted from the same laser, the pilot signals each having a different optical frequency;
    determining an approximate laser phase noise present in an optical system based on the measured time differential of chromatic dispersion combined laser phase noise; and
    compensating for laser phase noise based on the determined approximate laser phase noise.

2. A method according to claim 1, further comprising compensating for chromatic dispersion in the optical system.

3. A method according to claim 1, wherein at least one of the two optical pilot signals includes a carrier signal for orthogonal frequency-division multiplexing.

4. A method according to claim 1, wherein measuring the differential of chromatic dispersion combined laser phase noise comprises measuring the beat of the two optical pilot signals against each other.

5. A non-transitory computer-readable medium comprising logic, when executed by a computer, for cancellation of chromatic dispersion combined laser phase noise, the logic comprising:
    logic for measuring a time differential of chromatic dispersion combined laser phase noise between two optical pilot signals transmitted from the same laser, the pilot signals each having a different optical frequency;
    logic for determining an approximate laser phase noise present in an optical system based on the measured time differential of chromatic dispersion combined laser phase noise; and
    logic for compensating for laser phase noise based on the determined approximate laser phase noise.

6. A computer-readable medium according to claim 5, further comprising logic for compensating for chromatic dispersion in the optical system.

7. A computer-readable medium according to claim 5, wherein at least one of the two optical pilot signals includes a carrier signal for orthogonal frequency-division multiplexing.

8. A computer-readable medium according to claim 5, wherein the logic for measuring the differential of chromatic dispersion combined laser phase noise comprises logic for measuring the beat of the two optical pilot signals against each other.

9. An optical system comprising:
    an optical fiber;
    a source of electromagnetic energy communicating coupled to the optical fiber; and
    an orthogonal frequency-division multiplexer (OFDM) communicatively coupled to the optical fiber and configured to:
        communicate an orthogonal frequency-division multiplexed signal over the optical fiber; and
        generate, using the source of electromagnetic energy, a first optical pilot signal at a first optical frequency and a second optical pilot signal at a second optical frequency;
    a receiver communicatively coupled to the optical fiber and configured to:
        measure a time differential of chromatic dispersion combined laser phase noise between the first optical pilot signal and the second optical pilot signal;
        determine an approximate laser phase noise present in the optical system based on the measured differential of chromatic dispersion combined laser phase noise; and
        compensate for laser phase noise based on the determined approximate laser phase noise.

10. An optical system according to claim 9, the receiver further configured to compensate for chromatic dispersion in the optical system.

11. An optical system according to claim 9, wherein at least one of the first optical pilot signal and the second optical pilot signal includes a carrier signal for the orthogonal frequency-division multiplexed signal.

12. An optical system according to claim 9, the receiver configured to measure the beat of the first optical pilot signal and the second optical pilot signal against each other in order to measure the differential of chromatic dispersion combined laser phase noise.

* * * * *